(No Model.)
J. P. EUSTIS.
HOLDER FOR VESSELS.
No. 318,887. Patented May 26, 1885.
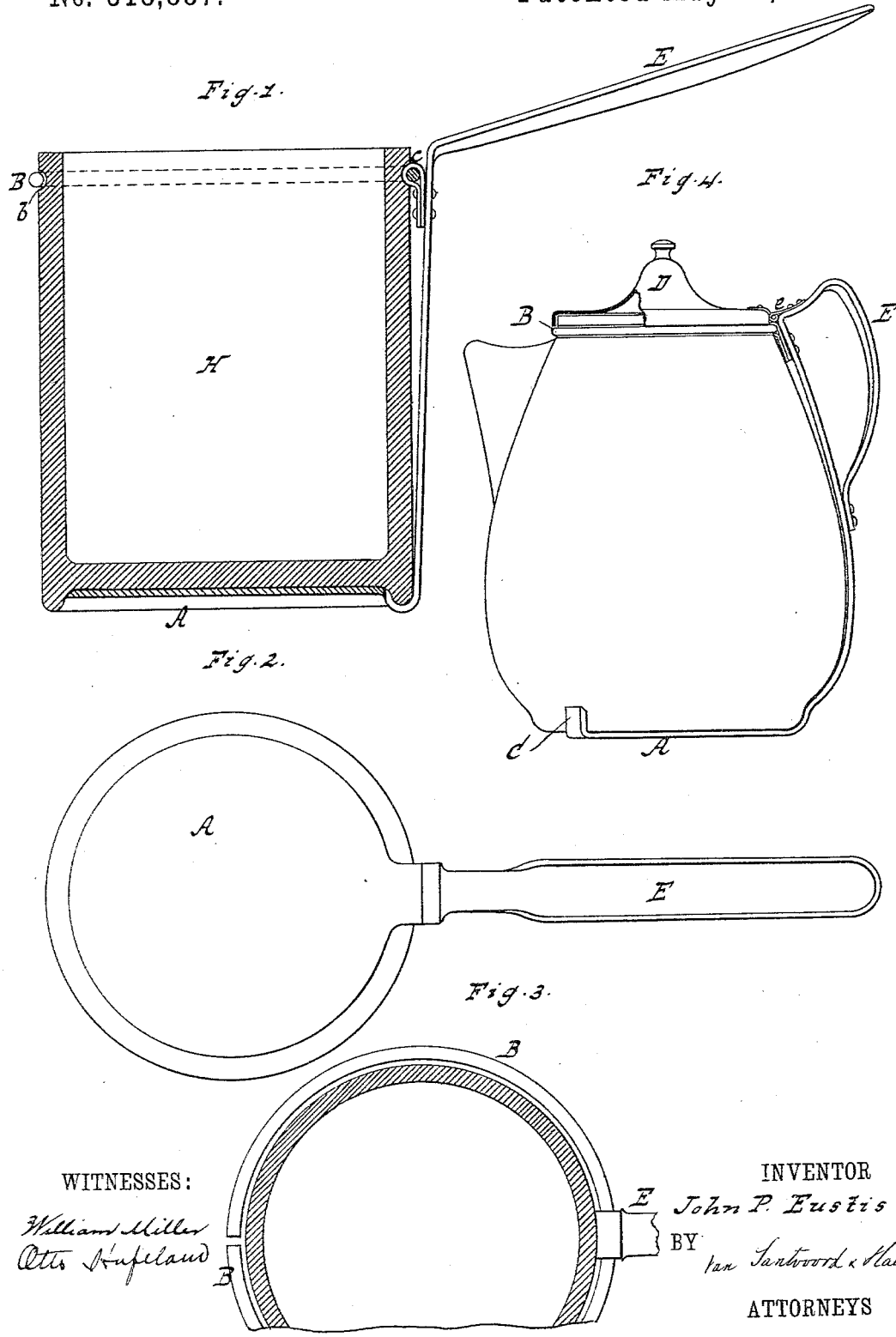
WITNESSES:
William Miller
Otto Hufeland
INVENTOR
John P. Eustis
BY
Van Santvoord & Hauff,
ATTORNEYS

UNITED STATES PATENT OFFICE.

JOHN P. EUSTIS, OF NEWARK, NEW JERSEY.

HOLDER FOR VESSELS.

SPECIFICATION forming part of Letters Patent No. 318,887, dated May 26, 1885.

Application filed July 10, 1884. (No model.)

*To all whom it may concern:*

Be it known that I, JOHN P. EUSTIS, a citizen of the United States, residing at Newark, in the county of Essex and State of New Jersey, have invented new and useful Improvements in Holders for Pots and other Articles, of which the following is a specification.

This invention has for its object to provide a simple and economical holder for carrying pots, kettles, and similar vessels; and to such end the invention consists in the novel construction of parts, hereinafter described and claimed, reference being made to the accompanying drawings, in which—

Figure 1 is a vertical section of the device. Fig. 2 is an inverted plan view thereof. Fig. 3 is a horizontal section of the device. Fig. 4 is an elevation of a modification of the device.

Similar letters indicate corresponding parts.

The letter A indicates the base; B, the clamp; E, the handle, and H represents a pot or other article held by the clamp. C, Fig. 4, are the guards.

The base A, as shown in Figs. 1 and 2, is a circular disk; but it may be made, as shown in Fig. 4, with guards C, or it may be made of wires bent over suitably to form guards for receiving a pot or other article.

The handle E may be continued in one piece to the base A, as seen in Fig. 1, or connected with said base A by a strip. The same handle may also be fixed or removable.

A cover, D, as shown in Fig. 4, may be hinged to either the handle E or the clamp B. In Fig. 4 it is shown connected with the handle E by a hinge, $e$.

The advantage gained by having a removable handle is that the pot can be placed in an oven or on the fire, taking less room without the handle than with the same; and if the handle were left on it would become hot, and hence inconvenient to handle, which is avoided by removing the handle.

The clamp B, as shown in the drawings, may be made in the form of a split ring, its two ends being apart to allow it to act as a spring and expand sufficiently to pass over the top of the jar and then lie in the groove $b$. It is fastened to the handle E or strip by means of a hinge, $c$, allowing it to be moved to and fro. The clamp B may also be made in the form of a spring band—as, for instance, a ring formed of coiled spring wire or metal. By having the clamp so constructed as to allow it to expand and contract said clamp will accommodate itself to the various expansions and contractions of the vessel H when exposed to varying temperatures without liability of the vessel H being broken.

The vessel H is shown in Fig. 1 as having a groove, $b$, to receive the clamp B; but if desired said groove $b$ may be omitted and the clamp B be slipped over the edge of the vessel H, which may be made smooth, in which case the clamp would be held in place by frictional contact.

What I claim as new, and desire to secure by Letters Patent, is—

1. A pot-holder consisting of the base A, for receiving the bottom of the pot, the handle E, connected with the base, and the ring-clamp B, connected with the handle for encircling the top part of the pot, substantially as described.

2. A pot-holder consisting of the base A, for receiving the bottom of the pot, the handle E, connected with the base, and the expansible spring-clamp connected with the handle for encircling the top part of the pot, substantially as described.

3. A pot-holder consisting of the base A, for receiving the bottom of the pot, the handle E, connected with the base, the ring-clamp connected with the handle for encircling the upper portion of the pot, and the cover D, for closing the pot, substantially as described.

In testimony whereof I have hereunto set my hand and seal in the presence of two subscribing witnesses.

JOHN P. EUSTIS. [L. S.]

Witnesses:
A. FABER DU FAUR, Jr.,
E. F. KASTENHUBER.